United States Patent [19]

Gieske et al.

[11] Patent Number: 4,780,349

[45] Date of Patent: Oct. 25, 1988

[54] DISPLAY PANEL

[76] Inventors: Detlef J. Gieske, 5995 W. Hampden, Suite G21, Denver, Colo. 80227; David Kawchak, 2767 Briargrove, #D571, Houston, Tex. 77057

[21] Appl. No.: 17,741

[22] Filed: Feb. 24, 1987

[51] Int. Cl.[4] .......................... B32B 3/06; G09F 13/04

[52] U.S. Cl. .................................... 428/100; 428/105; 428/131; 428/137; 40/576; 40/610; 24/306; 24/442; 248/205.2; 248/8; 211/49.1; 211/59.4; 211/134; 211/162

[58] Field of Search ................. 24/442, 306, 443, 444, 24/447; 40/576, 610; 248/205.2; 211/49.1, 59.4, 63, 134, 162; 428/100, 105, 131, 137, 138

[56] References Cited

U.S. PATENT DOCUMENTS

| | | | |
|---|---|---|---|
| 3,525,376 | 8/1970 | Muhlhauser | 24/442 |
| 3,908,830 | 9/1975 | Skrzelowski | 211/55 |
| 4,064,991 | 12/1977 | Swanson | 211/49 R |

FOREIGN PATENT DOCUMENTS

| | | | |
|---|---|---|---|
| 968137 | 5/1975 | Canada | 428/100 |

*Primary Examiner*—John E. Kittle
*Assistant Examiner*—P. J. Ryan
*Attorney, Agent, or Firm*—John S. Egbert

[57] ABSTRACT

A display panel comprising a structural layer of rigid material having a plurality of holes extending therethrough, a plurality of laminate sections fastened to the structural layer in parallel relationship, a fastening material fastened to the structural layer in an area between the laminate sections, and an attachment cleat affixed to the side of the structural layer opposite the laminate section. The fastening material is a VELCRO-type material that covers a linear array of holes in the structural layer. The structural layer is a sheet of pegboard material. The laminate sections extend longitudinally across the surface of the structural layer. The attachment cleat is fixedly attached to the side of the structural layer opposite the laminate sections. The attachment cleat has an angle cut along its lower edge for engaging a complementary angle cut in a support structure.

12 Claims, 6 Drawing Sheets

DISPLAY PANEL

TECHNICAL FIELD

The present invention relates to panels for the display of objects. More particularly, the present invention relates to portable panels that can be used to display merchandise, signs, photographs, or other objects.

BACKGROUND ART

In the setting of department stores, the display of merchandise often becomes a critical concern. Some merchandise may sell more rapidly in one location of a store than in another location. The introduction of new products for sale also creates problems as to the proper manner for displaying these products. In many instances, the inability to properly display merchandise can determine the success or failure of the product being offered for sale. Ultimately, this can reflect on the profitability of the store offering this merchandise for sale.

In the past, merchandise has been offered for sale from racks, fixtures, hangers, shelves, pegboards, and the like. Fixtures are often permanently embedded into the store. Racks are often unmovable or, at least, difficult to rearrange. Throughout virtually all department stores, shelves remain as shelves throughout the life of the store, racks remain as racks throughout the life of the store, and very little flexibility interchangeability, or adaptability occurs.

Pegboards have been widely used throughout stores for the display of merchandise. In recent years, many devices have been manufactured that enhance the flexibility of pegboards. Every year produces many new innovations and new technology in pegboard design and technology. Unfortunately, the use of the pegboard precludes the other forms of display of merchandise. Signs must be hung separately from the pegboard or hung from unsightly hooks on the pegboard. Photographs or other objects are difficult to display using standard pegboard technology. Generally, pegboards have a visually hideous appearance in stores. As such, department stores are reluctant to have extensive pegboard displays.

It is an object of the present invention to provide a display panel that is suitable for the receipt of pegboard hardware and accessories.

It is another object of the present invention to provide a display panel that is easily movable from one wall to another within a store.

It is another object of the present invention to provide a display panel that can receive signs, photographs, or other flat objects.

It is another object of the present invention to provide a display panel that can be uniformly manufactured and relatively easily installed.

It is still a further object of the present invention to provide a display panel that is aesthetically attractive.

These and other objects and advantages of the present invention will become apparent from a reading of the attached specification and appended claims.

SUMMARY OF THE INVENTION

The present invention is a display panel that comprises a structural layer of rigid material having a plurality of holes extending therethrough, a plurality of laminate sections fastened in parallel relation to each other, a fastening material that is affixed to the structural layer in the area between the parallel laminate sections, and an attachment device affixed to the side of the structural layer opposite the laminate sections. The fastening material ia affixed to the structural layer so as to cover a plurality of holes in the structural layer. The attachment device allows the structural layer to be connected to an adjacent surface.

The structural layer is a sheet of pegboard material. This pegboard material has evenly spaced holes opening across the entire face of the sheet.

The laminate sections extend longitudinally across the structural layer. These laminate sections are of a plastic material and serve to cover a plurality of holes in the pegboard material.

The fastening material is a VELCRO-type material that covers the area of the structural layer exposed between the parallel laminate sections. This VELCRO-type material is of loop material. The fastening material has an upper edge and a lower edge. The upper and lower edges are interposed between the laminate sections and the structural layer. This fastening material covers a linear array of holes in the pegboard material of the structural layer. The fastening material has a plurality of openings extending therethrough. These openings correspond to the locations of the linear array of holes in the structural layer.

The attachment device is a cleat that is fixedly attached to the side of the structural layer opposite the laminate sections. This cleat has an angle cut along its lower edge. This angle cut is for engaging a complementary angle cut in a support structure. This angle cut extends along the length of the cleat. This cleat, specifically, has a forty-five degree angle cut. The cleat slidably engages the complementary forty-five degree angle cut in a structural member fastened to the interior wall of a building.

The display panel further comprises a vertical crossmember mounted to the side of the structural layer opposite the laminate section. It also comprises a horizontal crossmember mounted to the side of the structural layer opposite the laminate sections. These vertical and horizontal crossmembers support the weight of the display panel.

The present invention is also a method of manufacturing a display panel that comprises the steps of: (1) fastening a strip of VELCRO-type material across a linear array of holes in a sheet of pegboard material; (2) attaching a first linear section of laminate material along one edge of the VELCRO-type material and to the sheet of pegboard material; and (3) attaching a second linear section of laminate material to the other edge of the VELCRO-type material and to the sheet of pegboard material.

The method of the present invention further comprises the step of attaching a cleat to the opposite side of the sheet of pegboard meterial. A complementary cleat is then fastened to the interior wall of a building. The sheet of pegboard material can be moved and placed onto the complementary cleat so as to allow the display panel to be appropriately situated in the building.

The present method further includes the steps of forming holes that extend through the VELCRO-type material such that the holes correspond to the linear array of holes in the sheet of pegboard material. Holes may also be formed through the laminate material so as to correspond to those holes of the pegboard material.

BEST MODE FOR CARRYING OUT THE INVENTION

Figure 1:
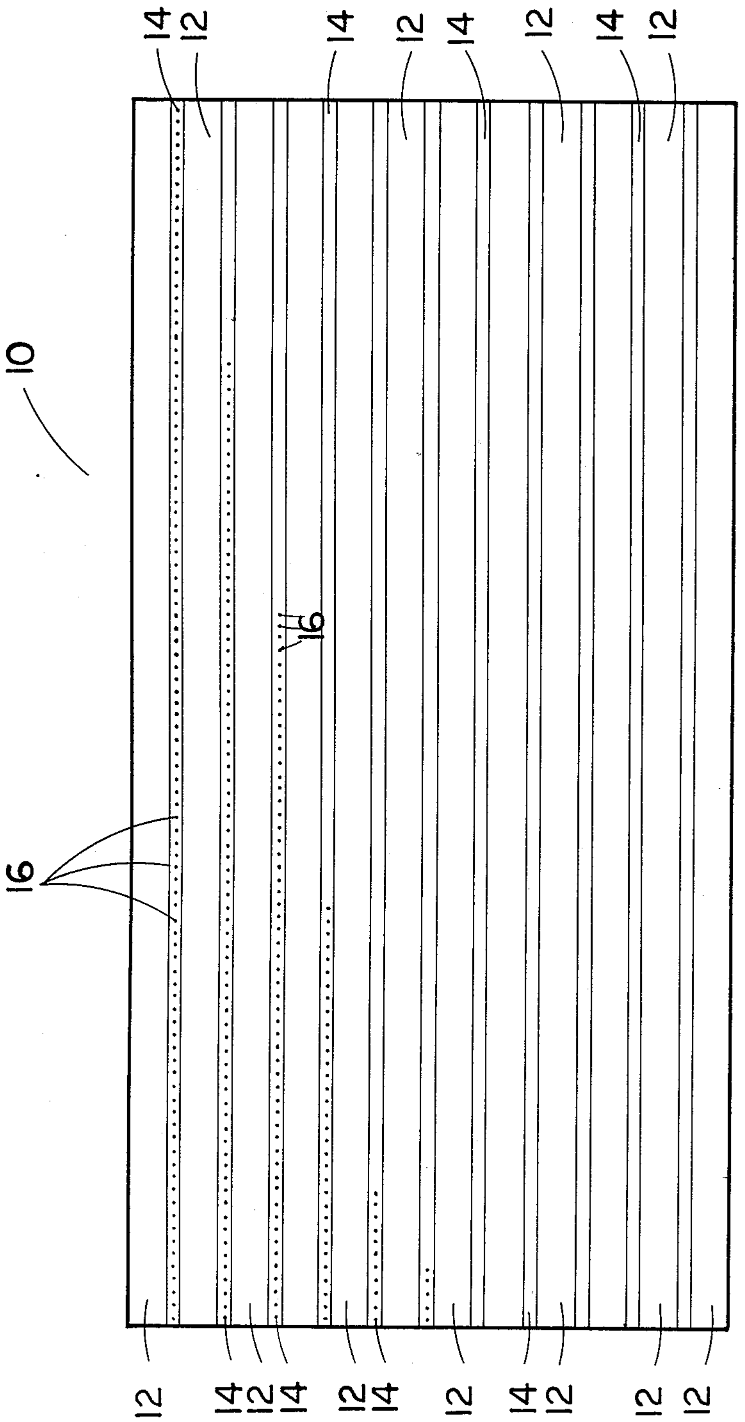
FIG. 1 shows a frontal view of the display panel in accordance with the preferred embodiment of the present invention.

Referring to FIG. 1, there is shown at 10 the display panel in accordance with the present invention. Display panel 10 has linear sections of laminate material 12 and a fastening material 14, such as VELCRO. As can be seen, the laminate sections 12 extend parallel to one another. The fastening material 14 is fastened to a structural layer (not shown in FIG. 1) in an area between adjacent laminate sections 12. The fastening material 14 is positioned adjacent a plurality of holes 16 formed through the fastening material 14 and in the structural layer. The holes 16 may extend through the fastening material 14 or may be covered by the fastening material 14.

Figure 2:
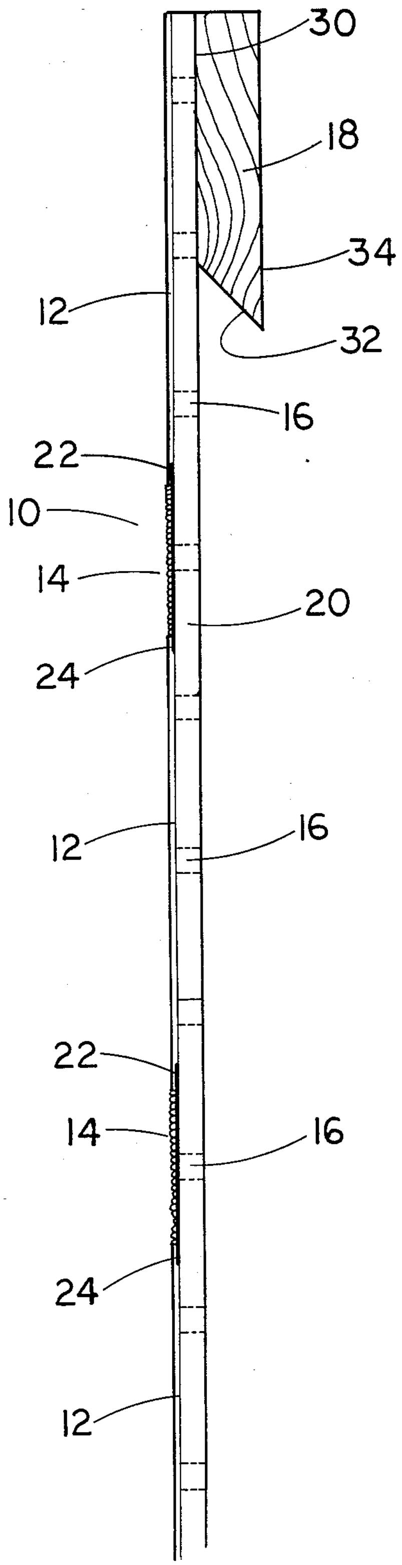
FIG. 2 shows a view, in side elevation, of the display panel of the present invention.

FIG. 2 shows a side view of the display panel 10. In particular, in FIG. 2, there is shown laminate sections 12, fastening material sections 14, attachment clear 18, and structural layer 20. Structural layer 20 is a sheet of pegboard material having a plurality of holes 16 extending therethrough. These holes 16 are evenly spaced across the entire face of structural layer 20. The laminate sections 12 are rigidly affixed to one surface of structural layer 20. These laminate sections are made of a plastic-type material. As shown in FIG. 2, laminate sections 12 cover a plurality of holes 16 in pegboard material 20. It is shown that the laminate sections 12 cover the holes 16 and do not allow the holes to open through the laminate sections. It may be possible, in keeping with the spirit of the present invention, that the holes 16 extend and open through the face of laminate sections 12.

Fastening material 14 is a VELCRO-type material and, preferably, loop material. This fastening material 14 covers the area of the structural layer 20 that is exposed between the parallel laminate sections 12. Fastening material 14 has an upper edge 22 and a lower edge 24. The upper edge is interposed and affixed between laminate section 12 and structural layer 20. Similarly, the lower edge 24 is interposed between and affixed between laminate section 12 and structural layer 20. This arrangement eliminates the unsightly appearance of the edges 22 and 24 and serves to securely place the fastening material 14 in position. Fastening material 14 covers a linear array of holes in the pegboard material 20. This plurality of openings extends through the fastening material 14 at the locations corresponding to the linear array of holes in the structural layer 20.

Attachment cleat 18 is a solid piece of wood that is rigidly fastened to the surface 30 of structural layer 20. Cleat 18 may be attached by stapling, gluing, or other means. Cleat 18 has a forty-five degree angle cut 32 along its bottom edge. Angle cut 32 tapers from the outer surface 34 inwardly toward the surface 30 of structural layer 20.

Figure 4:
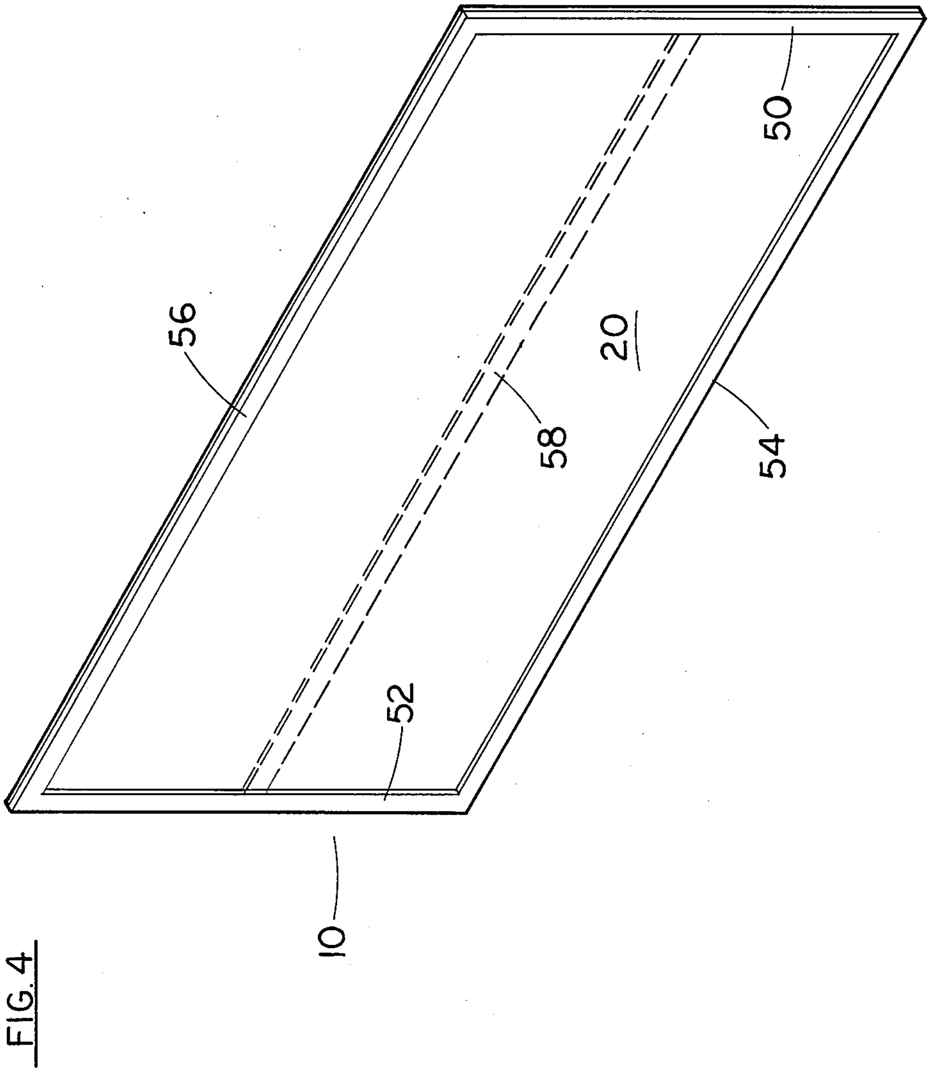
FIG. 4 is a rearward view, in perspective, of the display panel of the present invention.

FIG. 4 is a rearward view of the display panel 10 of the present invention. Structural layer 20 (without the plurality of holes) is shown in this rearward view. Vertical crossmembers 50 and 52 are mounted to the side of structural layer 20 opposite the laminate sections 12 and the fastening material sections 14. Vertical crossmembers 50 and 52 are affixed along the edges of the structural layer 20. Horizontal crossmembers 54 and 56 are similarly mounted to the side of structural layer 20 opposite the laminate sections 12. Horizontal corssmembers 54 and 56 extend along the top and bottom edges of the display panel 10 of the present invention. Another horizontal crossmember 58 may be placed along the center of structural layer 20 as added support for this display panel. The horizontal crossmembers 54 and 58 serve as the cleats for fastening the display panel to an adjacent surface, as described hereinafter. These vertical and horizontal crossmembers support the weight of the display panel once the display panel is mounted on an adjacent surface.

Figure 3:
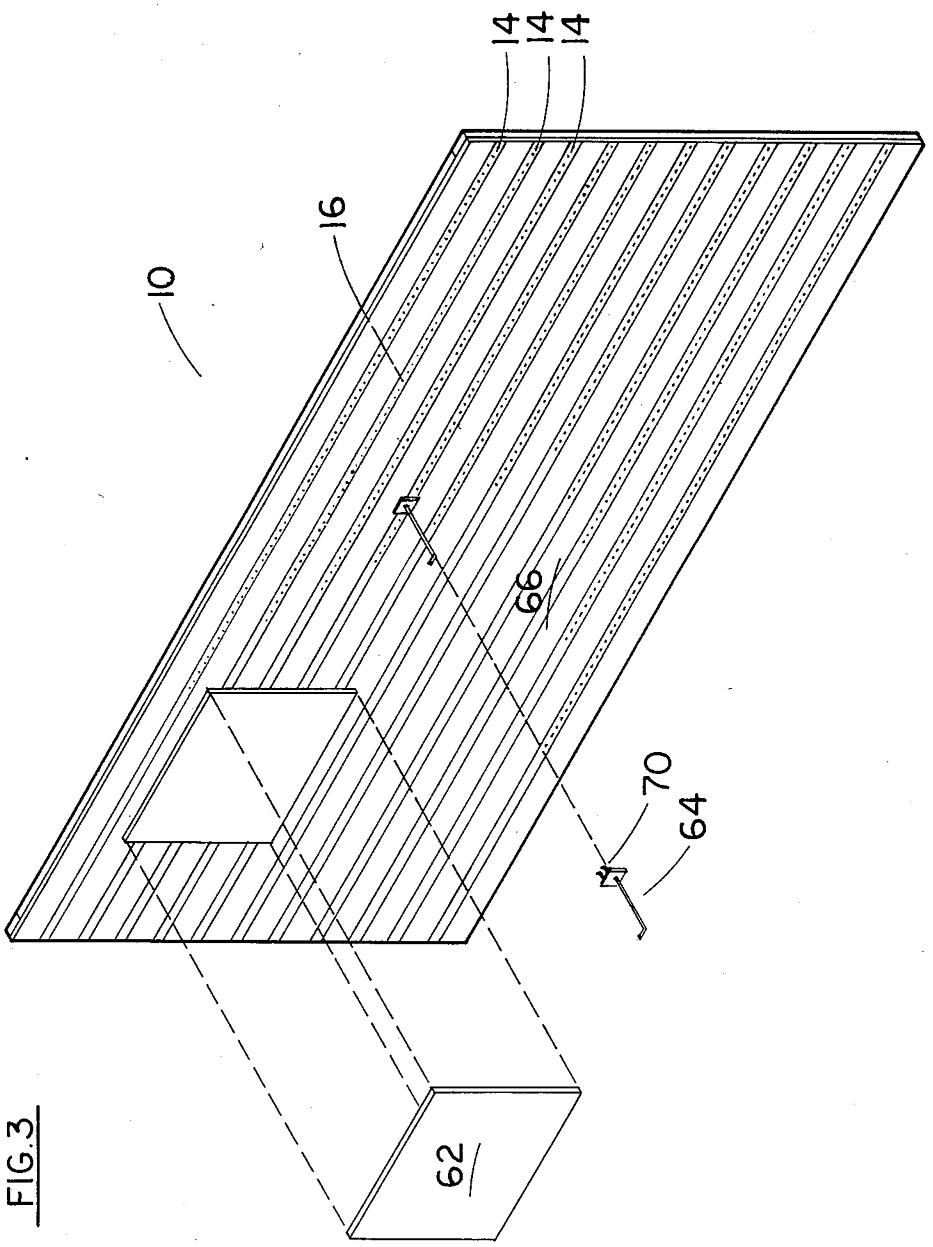
FIG. 3 is perspective view showing the display panel of the present invention and showing the manner in which objects are attached to the display panel.

FIG. 3 shows the display panel 10 in the manner in which the display panel 10 can support flat objects 62 or pegboard hardware 64. The flat object 62 may be placed against the strips of fastening material 14 such that the fastening material 14 will support the weight of the flat object 62. The flat object 62 is placed in surface-to-surface relationship with the face 66 of display panel 10. Ideally, the flat object 62 will have corresponding VELCRO-type hook material so as to allow for easy and secure engagement with the fastening material strips 14. Many times, the flat object 62 will have a material that will naturally engage the loop-material of fastening material strips 14. Flat object 62 may be signs, advertisements, photographs, or any other objects that can be displayed in two-dimensional fashion.

Pegboard hardware 64 is a hook that has end portions 70 that engage the holes 16 of the pegboard material 20 of the present invention. Pegboard hardware 64 is available in a wide variety of styles and configurations. The pegbaord hardware 64, illustrated in FIG. 3, is suitable for displaying clothing or other merchandise on hangers. Pegboard hardware 64 will support a substantial amount of weight outwardly from the front surface 66 of the display panel 10 of the present invention.

Figure 5:
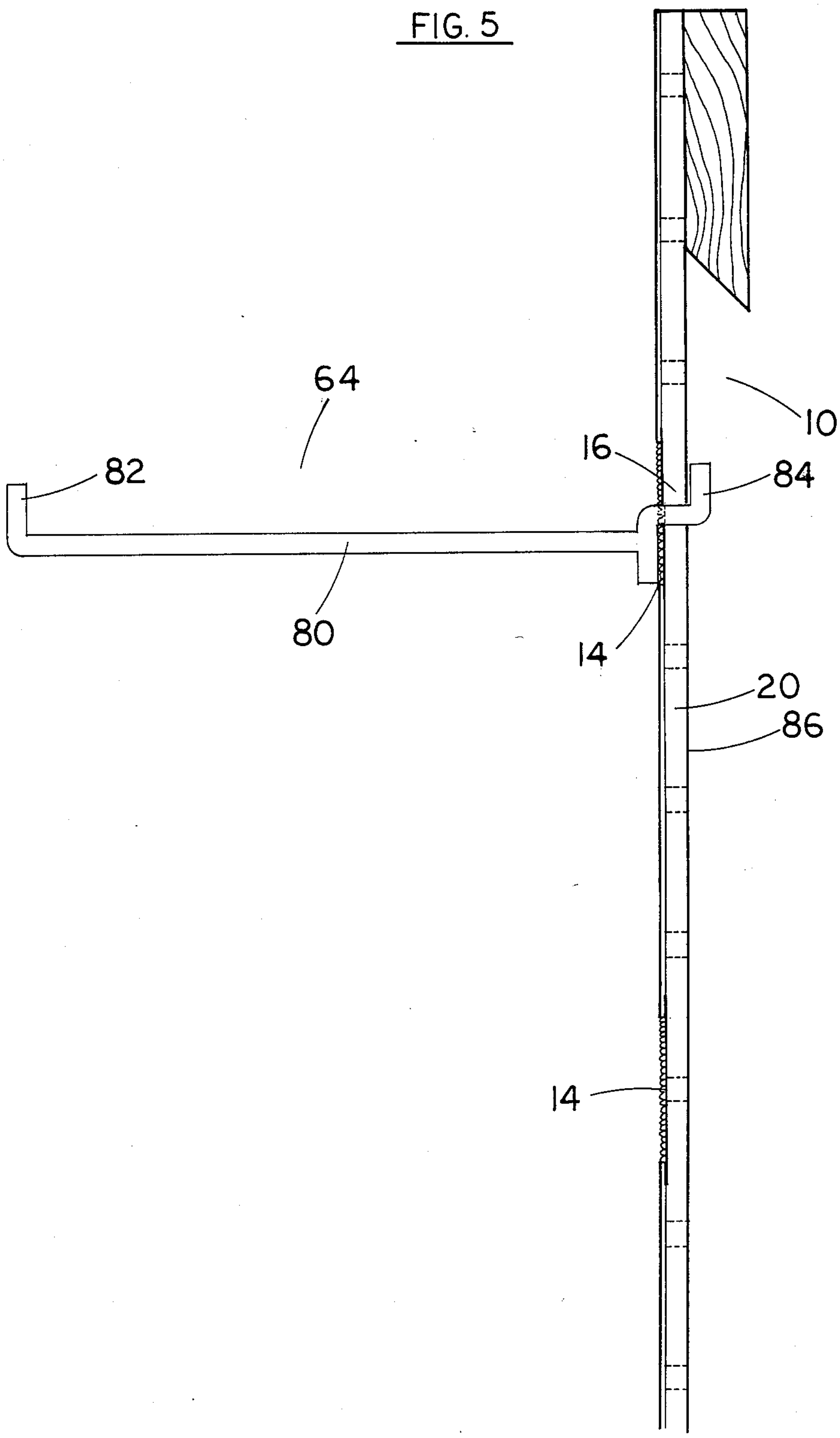
FIG. 5 is a view, in side elevation, of the present invention showing, in particular, the manner in which pegboard hardware is attached to the display panel.

FIG. 5 shows the arrangement by which the pegboard hardware 64 is mounted to the display panel 10 of the present invention. Pegboard hardware 64 has an outwardly extending member 80. An upwardly turned end 82 limits the travel of objects along the outwardly extending member 80. An S-shaped hook 84 is connected to the other end of member 80. This S-shaped hook 84 has a shape that allows the hook 84 to be passed through the opening 16 in fastening material 14. The upwardly extending end of hook 84 is juxtaposed against the rearward surface 86 of structural layer 20. This configuration gives the pegboard hardware 64 the necessary integrity and structural support so as to allow objects to be hung from the area of member 80.

Figure 6:
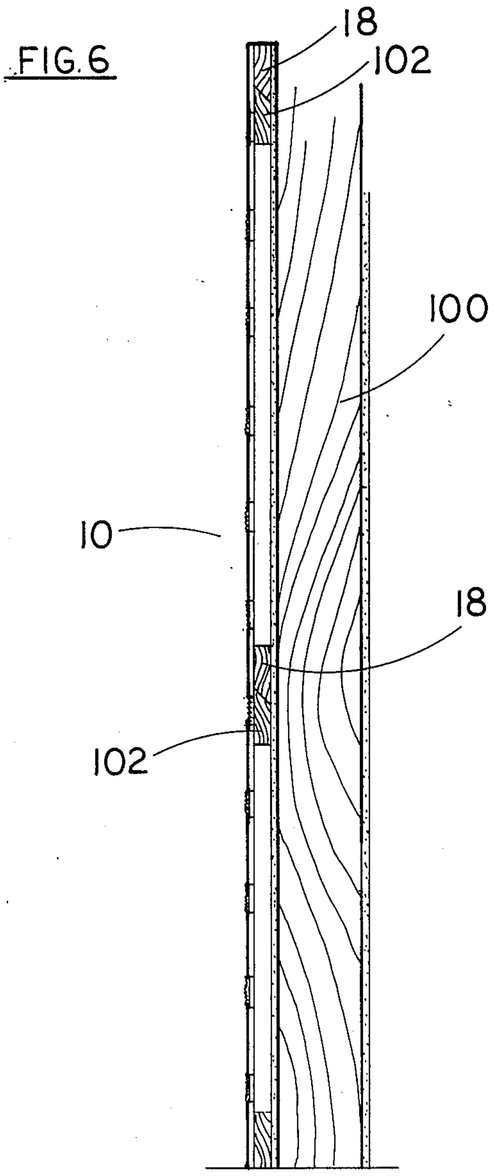
FIG. 6 is a side view showing the display panel as attached to the interior wall of a building.

FIG. 6 is a close-up view of the display panel 10 as maintained in position adjacent a wall 100. FIG. 6 also shows the manner in which the cleat 18 engages a complementary cleat 102 affixed to wall 100. Complementary cleat 102 has an angle cut about the top length-wise edge of cleat 102 which fits into the angle cut of cleat 18. In particular, cleat 102 has a forty-five degree angle cut in which the taper is from the top of the cleat downwardly to the wall 100. Display panel 10 is fastened to the wall 100 by lowering cleat 18 onto the angle cut of complementary cleat 102. The angle of cut serves to properly position the display panel 10 against wall 100, to retain display panel 10 in position, and to prevent display panel 10 from accidental dislodgement from wall 100. A proper vertical lifting force is required to remove cleat 18 from cleat 102.

Cleat 102 is fastened to wall 100. Cleat 102 may be screwed, bolted, glued, or otherwise affixed to wall 100. The only significant requirement is that the complementary cleat 102 be attached with sufficient strength to withstand the weight of display panel 10. If, after installation, it is found that the attachment force between the cleats and either display panel 10 or wall 100 is insufficient, then screws may be inserted through the panel 10 into wall 100. In this manner, the present invention would facilitate the semi-permanent mounting of the display panel 10 adjacent to wall 100.

The present invention offers a number of advantages over display walls existing previously. Most importantly, the present invention allows the display panel to be removed from the wall whenever required. If it is necessary to present the most appropriate color scheme, the display panel, along with its colored laminate sections, may be interchanged with other, differently colored display panels. The present invention allows signs, photographs, merchandise, and other items to be openly and favorably displayed from the outer surface of the display panel. The present invention allows standard pegboard hardware to be utilized through the openings of the VELCRO-type material. If necessary, the holes in the VELCRO-type material may be added subsequent to the installation of the display panel or may be prefabricated into the VELCRO-type material prior to the installation of the display panel. If necessary, holes may be formed in the laminate material so as to allow the additional display of merchandise, as needed.

When holes are introduced into the VELCRO-type material of the present invention, the configuration and color of the VELCRO-type material hides the appearance of the hole. Since VELCRO is dark, the VELCRO will mask the existence of the holes to a certain extent. The addition of the laminate material to the masonite material of the pegboard provides additional structural integrity to the display panel of the present invention. It is a typical problem with pegboards that the holes are chipped away and will deteriorate in appearance and in integrity over time. The laminate material will strengthen the masonite so that the hole ares will not be chipped away over time.

Additionally, the present invention can be manufactured rather easily and can be provided, for a significant cost savings, over other display panel designs.

An alternative embodiment of the present invention involves a different configuration of laminate material and VELCRO-type material. The preferred embodiment of the present invention has the laminate material and the VELCRO-type material extending across the pegboard surface horizontally. In the alternative embodiment, this laminate material and VELCRO-type material can extend vertically across the pegboard surface. Since the pegboard hardware typically has hooks for attaching to two adjacent holes, it would be necessary, in this alternative configuration, to have the VELCRO strips covering two linear arrays of holes. As such, the pegboard hardware can hook into adjacent holes along the VELCRO strips. This configuration of this alternative embodiment is, otherwise, similar in all respects to the embodiment described herein previously. The purpose for this alternative embodiment is that, in some cases, the store owner may find the vertical sections of laminate and VELCRO material to be more aesthetically pleasing than horizontal sections. The present invention can be configured to meet the specific requirements of the store owner.

The method of manufacturing the display panel of the present invention involves initially fastening a strip of VELCRO-type material along a linear array of holes in a sheet of pegboard material. A first linear section of laminate material is then fastened to the same face of the pegboard material so as to be aligned with one edge of the VELCRO-type material. A second linear section of laminate material is also affixed to the pegboard material and is adjacent the other edge of the VELCRO-type material. Since the VELCRO-type material has outwardly extending edges, it is preferably that the first and second linear sections of laminate material cover this unsightly edge portion. The laminate section may be attached to the pegboard by gluing, or other forms of adhesive bonding.

A cleat is then attached to the upper portion of the opposite side of the sheet of pegboard material. This cleat is attached by gluing, stapling, or other attachment techniques. This cleat should be formed such that the angle cut extends downwardly, as described herein previously.

So as to allow pegboard hardware to be inserted into the display panel, holes are formed by drilling, puncturing, or other means, through the VELCRO-type material such that the holes correspond to the linear array of holes in the sheet of pegboard material. If needed, holes may be formed through the laminate material by drilling or other means.

This method of manufacturing the panel allows the panel to be assembled in an expeditious and economical fashion. This form of assembly improves the appearance of the final product and adds additional structural integrity to the final product.

The foregoing disclosure and description of the invention is illustrative and explanatory thereof. Various changes in the method steps, as well as in the details of the illustrated apparatus, may be made within the scope of the appended claims without departing from the true spirit of the invention. The present invention should only be limited by the following claims and their legal equivalents.

I claim:

1. A display panel comprising:

a structural layer of rigid material, said structural layer having a plurality of holes extending therethrough;

a plurality of laminate sections fastened to said structural layer, each of said laminate sections extending parallel relative to each other;

a fastening material means affixed to said structural layer in an area between said laminate sections, said fastening material means disposed adjacent at least a portion of said plurality of holes in said structural layer, said fastening material means having a plurality of openings extending therethrough, said openings corresponding to the locations of said holes in said structural layer; and attachment means affixed to the side of said structural layer opposite said laminate sections, said attachment means for connecting said structural layer to an adjacent surface.

2. The display panel of claim 1, said structural layer being a sheet of pegboard material.

3. The display panel of claim 1, said laminate sections extending longitudinally across said structural layer.

4. The display panel of claim 1, said fastening material means comprising VELCRO-type material, said fastening material means covering the area of said structural layer exposed between said laminate sections.

5. The display panel of claim 4, said fastening material means having an upper edge and a lower edge, said upper and lower edges interposed between said laminate sections and said structural layer.

6. The display panel of claim 4, said fastening material means covering a linear array of holes in said structural layer.

7. The display panel of claim 1, said attachment means comprising:

a cleat fixedly attached to the side of said structural layer opposite said laminate sections, said cleat having an angle cut along its lower edge, said angle cut for engaging a complementary angle cut in a support structure, said angle cut extending along the length of said cleat.

8. The display panel of claim 7, said cleat having a forty-five degree angle cut, said cleat slidably engaging a complementry forty-five degree angle cut in a structural member fastened to the interior wall of a building, said structural layer having a plurality of cleats distal from each other and extending longitudinally along said structural layer.

9. The display panel of claim 1, further comprising:

a vertical cross member mounted to the side of said structural layer opposite said laminate sections; and a horizontal crossmember mounted to the side of said structural layer opposite said laminate sections, said vertical and horizontal crossmembers for supporting the weight of said display panel.

10. A method of manufacturing a display panel comprising:

fastening a strip of VELCRO-type material across a linear array of holes in a sheet of pegboard material;

attaching a first linear section of laminate material to the sheet of said pegboard material, one edge of said laminate material being adjacent said VELCRO-type material;

attaching a second linear section of laminate material to said sheet of pegboard material, one edge of said second linear section of laminate material being adjacent said VELCRO-type material; and attaching a cleat to the opposite side of said sheet of pegboard material.

11. The method of claim 10, further comprising the step of:

forming holes extending through said VELCRO-type material such that said holes correspond to the linear array of holes of said sheet of pegboard material.

12. The method of claim 11, further comprising the step of:

forming holes extending through said laminate material such that said holes correspond to the holes in said sheet of pegboard material.

* * * * *